US010636073B2

(12) United States Patent
Zhu et al.

(10) Patent No.: US 10,636,073 B2
(45) Date of Patent: Apr. 28, 2020

(54) PREFERENCE LEARNING WITH CLUSTERING

(71) Applicant: The Regents Of The University Of California, Oakland, CA (US)

(72) Inventors: Kevin Zhu, San Diego, CA (US); Wei Chen, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 204 days.

(21) Appl. No.: 15/567,048

(22) PCT Filed: Apr. 15, 2016

(86) PCT No.: PCT/US2016/027898
§ 371 (c)(1),
(2) Date: Oct. 16, 2017

(87) PCT Pub. No.: WO2016/168703
PCT Pub. Date: Oct. 20, 2016

(65) Prior Publication Data
US 2018/0137552 A1 May 17, 2018

Related U.S. Application Data

(60) Provisional application No. 62/148,668, filed on Apr. 16, 2015.

(51) Int. Cl.
*G06Q 30/00* (2012.01)
*G06Q 30/06* (2012.01)
(Continued)

(52) U.S. Cl.
CPC ....... *G06Q 30/0631* (2013.01); *G06F 16/285* (2019.01); *G06N 20/00* (2019.01);
(Continued)

(58) Field of Classification Search
CPC combination set(s) only.
See application file for complete search history.

(56) References Cited

U.S. PATENT DOCUMENTS

2004/0015386 A1* 1/2004 Abe ................ G06Q 10/06375
705/7.29
2009/0164516 A1* 6/2009 Svendsen ............ G11B 27/105
(Continued)

FOREIGN PATENT DOCUMENTS

WO WO-2010144766 A1 12/2010

OTHER PUBLICATIONS

Yin, D. (2013). Prediction and recommendation in online media (Order No. 3598939). Available from ProQuest Dissertations and Theses Professional. (1459823426). Retrieved from http://dialog.proquest.com/professional/docview/1459823426?accountid=161862.*

(Continued)

*Primary Examiner* — Resha Desai
(74) *Attorney, Agent, or Firm* — Mintz Levin Cohn Ferris Glovsky and Popeo, P.C.

(57) ABSTRACT

In one aspect, there is provided a method for preference learning. The method may include: determining whether existing data associated with a user is available, wherein the existing data includes preference weights assigned to user clusters; when existing data associated with the user is unavailable: selecting, based on a ranking of the user clusters, a user cluster; providing, based on a selected user cluster, recommendations to the user; and assigning, based on a response of the user to the recommendations, a preference weight to each of the selected user cluster and/or another user cluster; and when existing data associated with the user is available, determining whether to exploit the existing data or to explore new preferences for the user, wherein exploiting comprises providing the recommenda- (Continued)

tions based on the existing data, and wherein exploring comprises providing the recommendations by selecting a user cluster not assigned a preference weight.

18 Claims, 3 Drawing Sheets

(51) Int. Cl.
    *G06F 16/28*     (2019.01)
    *G06N 20/00*     (2019.01)
    *G06Q 30/02*     (2012.01)
    *H04N 21/25*     (2011.01)
    *H04N 21/258*     (2011.01)

(52) U.S. Cl.
    CPC ............. *G06Q 30/00* (2013.01); *G06Q 30/02* (2013.01); *G06Q 30/0224* (2013.01); *H04N 21/252* (2013.01); *H04N 21/25891* (2013.01)

(56) References Cited

U.S. PATENT DOCUMENTS

| | | |
|---|---|---|
| 2012/0036523 A1 | 2/2012 | Weintraub et al. |
| 2013/0066921 A1 | 3/2013 | Mark et al. |
| 2014/0108307 A1 | 4/2014 | Raghunathan et al. |
| 2015/0039539 A1* | 2/2015 | Shivashankar ........ G06N 20/00 706/12 |

OTHER PUBLICATIONS

Park, et al., Pairwise preference regression for cold-start recommendation, Proceedings of the third ACM Conference on Recommender systems, Oct. 23, 2009.
Vanchinathan, et al., Explore-exploit in top-n recommender systems via Gaussian processes, Proceedings of the 8th ACM Conference on Recommender systems, Oct. 6, 2014.
International Searching Authority at the U.S. Patent and Trademark Office, International Search Report and Written Opinion for PCT/US2016/027898, dated Jul. 15, 2016, 14 pages.

* cited by examiner

PREFERENCE LEARNING WITH CLUSTERING

CROSS REFERENCE TO RELATED APPLICATIONS

This application is a national-phase entry of Patent Cooperation Treaty Application No. PCT/US2016/027898 filed Apr. 15, 2016, entitled "PREFERENCE LEARNING WITH CLUSTERING," which claims the benefit of priority to U.S. Provisional Patent Application No. 62/148,668 filed Apr. 16, 2015, entitled "LEARNING HETEROGENEOUS PREFERENCES WITH CLUSTERING ALGORITHMS," the contents of which are hereby incorporated by reference in their entirety.

TECHNICAL FIELD

The subject matter disclosed herein relates to machine learning and more specifically to preference learning.

BACKGROUND

Recommendation systems seek to identify content and/or products that are consistent with individual user preferences. Oftentimes, insights from a recommendation system may be applied towards creating a personalized browsing experience, which can increase a website's traffic and/or sales. For example, a recommendation system may suggest material (e.g., news articles, music, videos) that best interests users of an online content provider. Similarly, a web retailer may deploy a recommendation system that targets its users with products that are more likely to be purchased by each user.

Conventional recommendation systems rely primarily on a priori knowledge of individual user preferences in order to generate recommendations. That is, recommendations from conventional recommendation systems are generally guided by a user's history of past interactions (e.g., browsing, searches, and/or purchases) with a website. As such, conventional recommendation systems often perform poorly in the absence of existing data such as when encountering new users to a website. Moreover, even when individual user preferences are known, conventional recommendation systems tend to single-mindedly exploit this existing data while foregoing opportunities to discover more through exploration of individual users' potential preferences. Consequently, the performance of conventional recommendation systems may further stagnate over time.

SUMMARY

Methods, systems, and apparatus, including computer program products, are provided for preference learning. In some example embodiments, there is provided a method that includes: determining whether existing data associated with a user is available, wherein the existing data includes at least one preference weight assigned to at least one of a plurality of user clusters; when existing data associated with the user is not available: selecting, based at least in part on a ranking associated with the plurality of user clusters, a user cluster from the plurality of user clusters; providing, based at least in part on a selected user cluster, one or more recommendations to the user; and assigning, based at least in part on a response of the user to the one or more recommendations, a preference weight to the selected user cluster and/or another user cluster; and when existing data associated with the user is available, determining whether to exploit the existing data or to explore new preferences for the user, wherein exploiting the existing data comprises providing the one or more recommendations based at least in part on the existing data, and wherein exploring new preferences for the user comprises providing the one or more recommendations at least by selecting a user cluster that is not assigned a preference weight.

In some variations, one or more of the features disclosed herein including the following features can optionally be included in any feasible combination. The determining may be based on relative proportions such that existing data is exploited during a proportion of occasions and new preferences for the user are explored during a remaining proportion of occasions. The relative proportions may be determined at least by applying one or more of a $\varepsilon$-greedy, $\varepsilon$-first, $\varepsilon$-decreasing, adaptive $\varepsilon$-greedy based on value differences, and contextual $\varepsilon$-greedy strategy. The response of the user may comprise one or more of mouse clicks and purchases of items comprising the one or more recommendations. The preference weight may comprise a vector, and wherein each value in the vector corresponds to a type of response to a recommendation.

The method may further include selecting, based at least in part on a ranking associated with each of a plurality of user clusters not assigned a preference weight, the user cluster that is not assigned a preference weight. The ranking associated with each of the plurality of user clusters may correspond to one or more of a frequency of interaction with a user cluster, when a user cluster was last selected, and whether a user cluster is subject to a sale and/or promotion.

The method may further include generating the plurality of user clusters by at least segmenting a plurality of users based at least in part on user attributes and user preferences. The generating of the plurality of user clusters may be performed based on data associated with other users. Each of the plurality of user clusters may be associated with an item, a category of items, and/or a source of items, and wherein users in each user cluster share a preference for the item, the category or items, and/or the source of items. The method may further include: identifying at least one attribute associated with the user; and assigning a preference weight to a third user cluster based at least in part on a match between the attribute associated with the user and an attribute that is shared by other users in the third user cluster. At least one pair of user clusters comprising the plurality of user clusters may be associated with a proximity weight. The proximity weight may indicate a likelihood that a user having a preference for an item, category of items, and/or source of items that is associated with one user cluster will also have a preference for a different item, category of items, and/or source of items that is associated with another user cluster. The selected user cluster and the other user cluster may be associated with a proximity weight. A preference weight may be assigned to each of the selected user cluster and the other user cluster when the preference weight exceeds a threshold.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In some example embodiments, a recommendation system may be configured to learn a user's preferences by providing one or more recommendations in the absence of existing data specific to the user. Existing data associated with a user may include the user's attributes and/or preferences. However, such existing data may be unavailable for a new user to a content provider and/or online retailer. As such, the recommendation system may select, based on a ranking associated with the plurality of user clusters, a user cluster from the plurality of user clusters. The recommendation system may provide one or more recommendations based on that user cluster. The recommendation system may assign a preference weight to the user cluster and/or one or more other user clusters based on the user's responses to the recommendations. For example, the preference weight may reflect the user's interactions (e.g., mouse click, purchase) with the products and/or contents indicated by the one or more recommendations.

In some example embodiments, each individual user cluster may be associated with a preference that is shared by all users included in that user cluster. For example, a user cluster may be associated with an item (e.g., product or content), category (e.g., of products or content), and/or source (e.g., brand, manufacturer, creator of products or content). Users in the user cluster may share a preference for that item, category, and/or source. In the absence of existing data associated with a new user, the recommendation system may select a user cluster based on one or more other criteria including a ranking associated with each user cluster.

In some example embodiments, the ranking associated with a user cluster may be determined without existing data associated with a specific user. For example, the ranking associated with a user cluster may correspond to a frequency of previous interactions (e.g. mouse clicks, purchases) by other users with respect to an item, category, and/or source associated with the user cluster. The user cluster ranking may also indicate when the user cluster was last selected. Alternately or additionally, the ranking associated with a user cluster may correspond to whether an item, category, and/or source associated with the user cluster are subject to a sale or promotion.

In some example embodiments, the recommendation system may generate a plurality of user clusters by segmenting users into groups based on existing data that includes, individual user attributes (e.g., demographics) and preferences (e.g., for an item, category, and/or source). The user clusters may be generated using one or more clustering techniques including, but limited to, connectivity-based clustering, centroid-based clustering, distribution-based clustering, and density-based clustering. Moreover, each individual pair of user clusters may be associated with a proximity weight indicating a relationship between the pair of clusters. For example, the proximity weight may indicate a probability or likelihood that users in one user cluster who have a preference for one item, category, and/or source may also have a preference for a different item, category, and/or source that is associated with another user cluster.

In some example embodiments, the recommendation system may be configured to continue learning the preferences of a user when the recommendation system has accumulated existing data associated with the user. For instance, the recommendation system may have existing data associated with a user returning to a content provider and/or online retailer. The recommendation system may have existing data that is specific to the user including preference weights that are assigned to one or more user clusters based on the user's past responses to recommendations from the recommendation system. Thus, the recommendation system may exploit the existing data by selecting, based on the preference weight assigned to one or more user clusters, a user cluster. Alternately or additionally, the recommendation system may exploit the existing data by selecting, based on the proximity weights assigned to at least some pairs of user clusters, a user cluster. The recommendation system may provide one or more recommendations based on the selected user cluster and assign a preference weight to that user cluster based on the user's responses to the recommendations.

Alternately or additionally, the recommendation system may not exploit the existing data on the user. Instead, the recommendation system may explore new preferences for the user by selecting a user cluster that is not assigned a preference weight. For example, to explore a user's new preferences, the recommendation system may select, from a plurality of user clusters not assigned a preference weight, a user cluster based on the ranking associated with the cluster. The user cluster ranking may reflect when a user cluster was last selected. Thus, the recommendation system may select, based on the ranking, the least (or most) recently selected user cluster. Alternately or additionally, the ranking may correspond to a frequency of interaction with an item, category, and/or source associated with the user cluster. As such, the recommendation system may select a user cluster having the highest (or lowest) frequency of interactions. The user cluster ranking may also correspond to whether an item, category, and/or source associated with the user cluster are subject to a sale and/or promotion. The recommendation system may select, based on the ranking, a user cluster that is (or is not) subject to a sale and/or promotion.

In some example embodiments, the recommendation system may determine whether to use existing data to provide one or more recommendations to a user. That is, the recommendation system may determine whether to exploit existing data or explore new preferences for a user. For example, the recommendation system may apply one or more strategies when evaluating the choice between exploitation and exploration. The one or more strategies may include ε-greedy, ε-first, ε-decreasing, adaptive ε-greedy based on value differences, and contextual ε-greedy.

Figure 1:
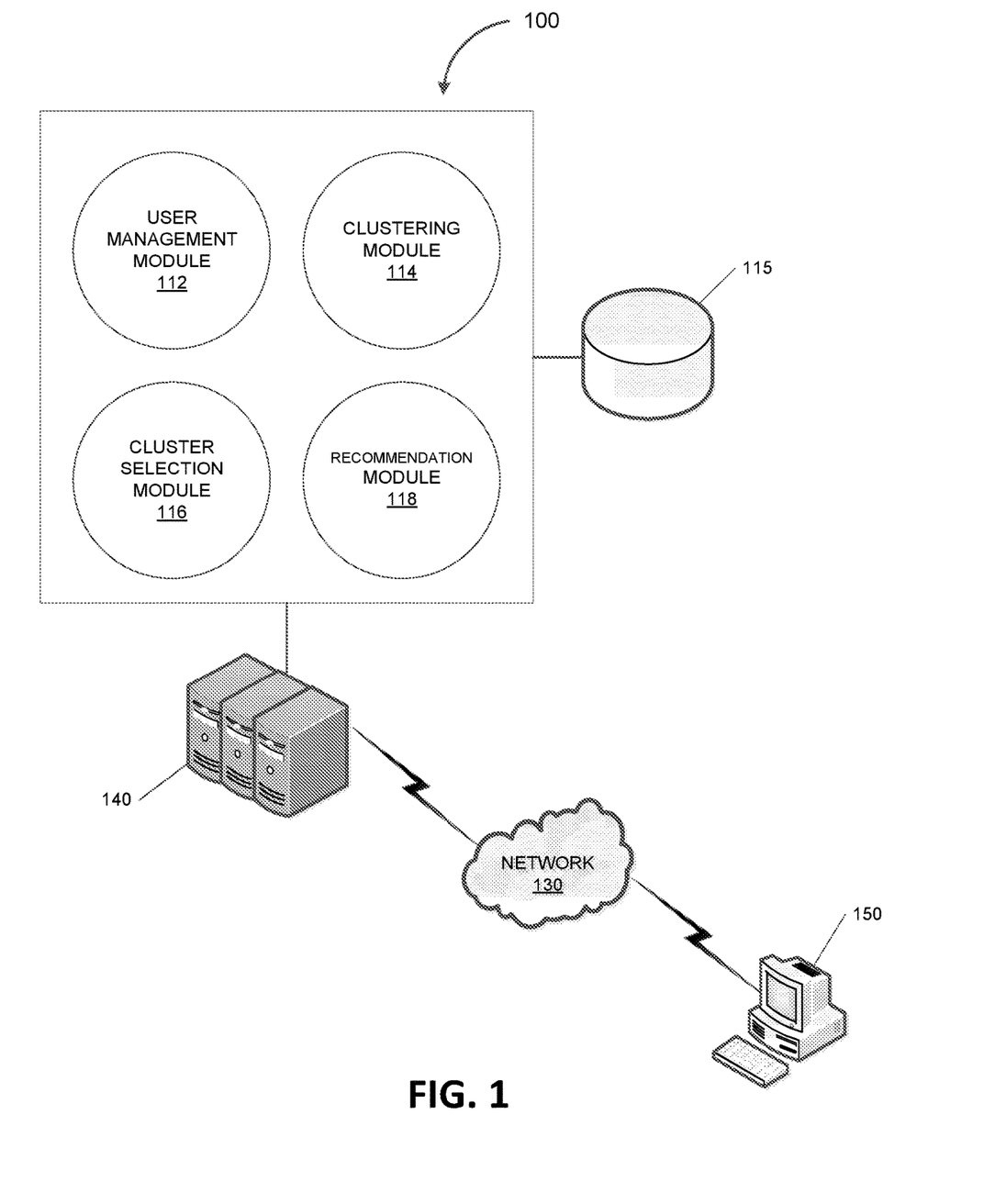
FIG. 1 depicts a system diagram illustrating a recommendation system, in accordance with some example embodiments.

FIG. 1 depicts a system diagram illustrating a recommendation system 100, in accordance with some example embodiments. Referring to FIG. 1, in some example embodiments, the recommendation system 100 may be realized in digital electronic circuitry, integrated circuitry, specially designed application specific integrated circuits (ASICs), field programmable gate arrays (FPGAs) computer hardware, firmware, software, and/or combinations thereof.

In some example embodiments, the recommendation system 100 may include one or more processors that implement a plurality of modules including a user management module 112, a clustering module 114, a cluster selection module 116, and a recommendation module 116. The recommendation system 100 may include additional and/or different modules without departing from the scope of the present disclosure The user management module 112 may be configured to determine the availability of existing data associated with a user 150. For example, the user management module 112 may determine whether existing data on a user is available to the recommendation system 100 when the user starts a new session (e.g., by landing on a website). In some example embodiments, existing data may not be available for a new user to a content provider and/or online retailer. By contrast, at least some existing data (e.g., user attributes and/or preferences) may be available for a user who is returning to a website. For example, the existing data may be available from cookies (e.g., provided by the user), site logs, and/or a The clustering module 114 may be configured to generate a plurality of user clusters by segmenting users into groups based on existing data. Each individual user cluster may be associated with a preference that is shared by all users included in that user cluster. For example, a user cluster may be associated with an item (e.g., product or content), category (e.g., of products or content), and/or source (e.g., brand, manufacturer, creator of products or content) that is preferred by every user in that user cluster.

In some example embodiments, the clustering module 114 may segment, based on existing data on individual user attributes (e.g., demographics) and preferences (e.g., for an item, category, and/or source), users into groups. For example, the clustering module 114 may perform the segmentation of users offline (e.g., separately from, and/or prior to, the provision of any recommendations by the recommendation system 100). In some example embodiments, the clustering module 114 may generate the plurality of user clusters by applying a clustering technique including, for example, connectivity-based clustering, centroid-based clustering, distribution-based clustering, and density-based clustering.

In some example embodiments, a user cluster may be associated with a preference weight that is specific to a user (e.g., the user 150). The clustering module 114 may assign a preference weight to a user cluster based on the user's response to recommendations made based on that user cluster. The value of the preference weight associated with a user cluster may indicate a likelihood that a user may interact (e.g., click on, purchase) with recommendations made based on that user cluster. For example, a user cluster associated with a specific item (e.g., a smartphone) may be assigned a preference weight having one (e.g., relatively higher) value if a user made a purchase of the specific item. Alternately, the user cluster may be assigned a preference weight having a different (e.g., relatively lower) value if the user only clicked on the item but did not make a purchase or if the user did not click on the item. In addition, the value of the preference weight associated with the user cluster may be cumulative in order to reflect the user's responses to the item on multiple occasions (e.g., clicks during earlier visits and a purchase during a subsequent visit).

In some example embodiments, the clustering module 114 may also be configured to assign a proximity weight at least some pairs of user clusters. In some example embodiments, the proximity weight may indicate a relationship between different pairs of user clusters. For example, the value of the proximity weight may correspond to a probability or likelihood that users in one user cluster who have a preference for one item, category, and/or source may also have a preference for a different item, category, and/or source associated with another user cluster. According to some example embodiments, when assigning a preference weight to one user cluster, the clustering module 114 may also assign a preference weight to one or more other user clusters based on proximity weights. For example, when assigning a preference weight to one user cluster, the clustering module 114 may further assign a preference weight to another user cluster if the proximity weight associated with the two user clusters exceeds a threshold.

In some example embodiments, the clustering module 114 may store data corresponding to the plurality of user clusters, preference weights, and proximity weights in a data store 115 coupled with the recommendation system 100.

The cluster selection module 116 may be configured to select a user cluster in accordance with the availability of existing data (e.g., as determined by the user management module 112). As such, in some example embodiments, the cluster selection module 116 may be configured to select a user cluster in the absence of existing data associated with a user (e.g., new user). When existing data associated with a user is unavailable, the cluster selection module 116 may select, based on the ranking associated with individual user clusters, a user cluster. For instance, the cluster selection module 116 may select a user cluster having a highest (or lowest) ranking. The user cluster ranking may be determined without existing data associated with a specific user. Thus, user clustering ranking may be available even a user is new to a website. For example, the user cluster ranking may be determined based on a frequency of previous interactions by other users with respect to an item, category, and/or source associated with the user cluster. Alternately or additionally, the ranking associated with a user cluster may be determined based on when the user cluster was last selected and/or whether the user cluster is subject to a sale or promotion.

Alternately or additionally, when existing data associated with the user is available, the cluster selection module 116 may be further configured to determine whether to use the existing data to provide one or more recommendations to a user. That is, the cluster selection module 116 may determine whether to exploit the existing data or to explore new preferences for the user. In some example embodiments, the cluster selection module 116 may make the determination based on relative proportions such that the cluster selection module 116 may choose to exploit existing data during a proportion of occasions and explore new preferences during a remaining proportion of occasions. The cluster selection module 116 may determine the relative proportions by applying one or more strategies including $\varepsilon$-greedy, $\varepsilon$-first, $\varepsilon$-decreasing, adaptive $\varepsilon$-greedy based on value differences, and contextual $\varepsilon$-greedy. Accordingly, the cluster selection module 116 may choose to explore new preferences during a proportion (e.g., 0.1) of occasions and choose to exploit existing data during a $(1-\varepsilon)$ proportion (e.g., 0.9) of occasions.

In some example embodiments, when the cluster selection module 116 determines to use the existing data to provide one or more recommendations to a user, the cluster selection module 116 may be configured to select a user cluster based on the preference weights that are assigned to user clusters based on the user's responses to recommendations made based on these user clusters. For example, to exploit existing data associated with a user, the cluster selection module 116 may select a user cluster having a highest preference weight.

In some example embodiments, when the cluster selection module 116 determines to not use the existing data and explore new preferences instead, the cluster selection module 116 may be configured to select a user cluster that is not assigned a preference weight. The cluster selection module 116 may be configured to select, based on proximity weights indicating a relationship to one or more user clusters having a preference weight, a user cluster without a preference weight. The cluster selection module 116 may also select, based on the user cluster ranking, a user cluster without a preference weight. For example, the user cluster ranking may correspond to when the user cluster was last selected. Alternately or additionally, the user cluster ranking may correspond to a frequency of interactions with the user cluster (e.g., clicks on and/or purchases of a corresponding item, category, and/or source). The user cluster ranking may also reflect whether the user cluster is subject to a sale or promotion.

The recommendation module 116 may be configured to provide, based on a user cluster (e.g., selected by the cluster selection module 116), one or more recommendations. For example, the cluster selection module 116 may select a user cluster that is associated with a specific item (e.g., product or content), category (e.g., of products or content), and/or source (e.g., brand, manufacturer, creator of products or content). As such, the recommendation module 116 may recommend the specific item, items belonging to the category, and/or items originating from the source.

According to some example embodiments, the recommendation system 110 may be communicatively coupled to a web server 140. The web server 140 may be associated with an entity including, for example, a content provider or online retailer. The web server 140 may be configured to deliver information (e.g., webpages) associated with the entity via a wired and/or wireless network 130 to one or more users including the user 150. In some example embodiments, the information provided by the web server 140 may include recommendations from the recommendation system 100.

Figure 2:
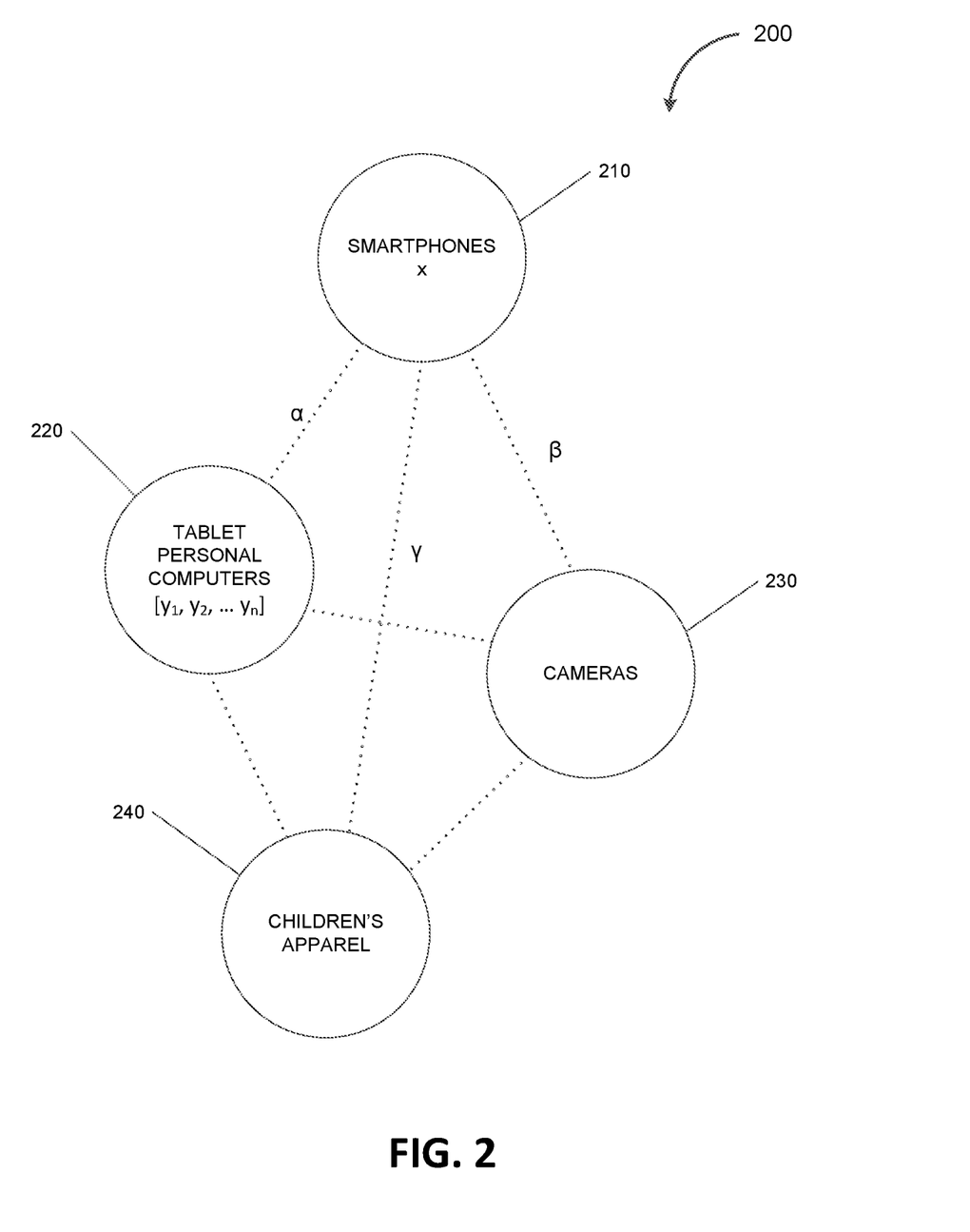
FIG. 2 depicts a group of user clusters, in accordance with some example embodiments.

FIG. 2 depicts a group 200 of user clusters, in accordance with some example embodiments. Referring to FIGS. 1-2, the group 200 of user clusters may be generated by the recommendation system 100 (e.g., the clustering module 114) and stored at the data store 115.

As shown in FIG. 2, the group 200 may include a plurality of user clusters including a first user cluster 210, a second user cluster 220, a third user cluster 230, and a fourth user cluster 240. A group of user clusters (e.g., the group 200 generated by the recommendation system 100) may include a different number of user clusters without departing from the scope of the present disclosure.

Each of the plurality of user clusters in the group 200 may correspond to a category of items (e.g., products or content). For example, as shown in FIG. 2, the first user cluster 210 may be associated with smartphones, the second user cluster 220 may be associated with tablet personal computers, the third user cluster 230 may be associated with cameras, and the fourth user cluster 240 may be associated with children's apparel. Alternately or additionally, each of the plurality of user clusters in the group 200 may correspond to specific items (e.g., of products or content) and/or sources (e.g., brands, manufacturers, or creators of products or content) without departing from the scope of the present disclosure.

The recommendation system 100 (e.g., the clustering module 114) may assign a preference weight to at least some user clusters in the group 200. In some example embodiments, the preference weight assigned to a user cluster may be a value indicative of a user's response to a recommendation made based on the user cluster. For example, the first user cluster 210 may be assigned a preference weight x corresponding to a user's overall response to a recommendation of one or more smartphones. The value of x may indicate a degree of preference and/or a likelihood that the user may interact with (e.g., click on, purchase) recommendations made based on the first cluster 210 (e.g., smartphones).

Alternately or additionally, in some example embodiments, the preference weight assigned to a user cluster may be a vector representing different types of responses to a recommendation made based on the user cluster. For example, the second user cluster 220 may be assigned with a preference weight vector $[y_1, y_2, \ldots y_n]$. Each value in the preference weight vector $[y_1, y_2, \ldots y_n]$ may correspond to a type of interaction with recommendations made based on the second cluster 220. For example, the value $y_1$ may indicate a likelihood that the user may click on a recommendation of a tablet personal computer while the value $y_2$ may indicate a likelihood that the user may make a purchase as a result of a recommendation of a tablet personal computer.

Some user clusters in the group 200 may not have been used when making a recommendation to a user. For example, the recommendation system 100 may not have selected the third cluster 230 and the fourth user cluster 240, and made any recommendations based on these user clusters. According to some example embodiments, user clusters that have not been used to make recommendations to a user are not assigned a preference weight. As shown in FIG. 2, the third cluster 230 and the fourth user cluster 240 are not associated with a preference weight since the recommendation system 100 has not made any recommendations of cameras (e.g., based on the third cluster 230) and of children's apparel (e.g., based on the fourth user cluster 240). In some example embodiments, the recommendation system 100 may select a user cluster (e.g., the third user cluster 230, the fourth user cluster 240) that is not associated with a preference weight when the recommendation system 100 is exploring new preferences for a user.

In some example embodiments, one or more pairs of user clusters may be associated with a proximity weight. The proximity weight may indicate a relationship between the pair of clusters. For example, the first user cluster 210 and the second user cluster 220 may be associated with a proximity weight α that indicates a likelihood that a user who is interested in smartphones (e.g., associated with the first user cluster 210) is also interested in tablet personal computers (e.g., associated with the second user cluster 220), and vice versa. Similarly, the first user cluster 210 and the third user cluster 230 may be associated with a proximity weight β that indicates a likelihood that a user who is interested in smartphones (e.g., associated with the first user cluster 210) is also interested in cameras (e.g., associated with the third user cluster 230). The first user cluster 210 and the fourth user cluster 240 may be associated with a proximity weight γ indicating a likelihood that a user who is interested in smartphones (e.g., associated with the first user cluster 210) is also interested in children's apparel.

The value of a proximity weight may reflect a degree of likelihood that a user interested in an item, category, and/or source associated with one user cluster is also interested in an item, category, and/or source associated with another user cluster. Thus, the proximity weight α may be greater than the proximity weight γ if a user who is interested smartphones is more likely to be also interested in tablet personal computers than in children's apparel.

According to some example embodiments, when assigning a preference weight to one user cluster, the recommendation system 100 (e.g., the clustering module 114) may further assign, based on one or more proximity weights, a preference weight to one or more other user clusters. For instance, the recommendation system 100 may assign the preference weight x (e.g., of the first user cluster 210) based on a user's response to recommendations of smartphones. In addition, the recommendation system 100 may also assign the preference weights for the second user cluster 220 and the third user cluster 230 as a user who demonstrated a interest in smartphones should also be interested in tablet personal computers and cameras as indicated by the proximity weights $\alpha$ and $\beta$.

In some example embodiments, when the recommendation system 100 assigns a preference weight to one user cluster, the recommendation system 100 may also assign a preference weight to another user cluster if the proximity weight associated with both user clusters exceeds a threshold. For example, when the recommendation system 100 assigns the preference weight x to the first user cluster 210, the recommendation system 100 may also assign the preference weight vector $[y_1, y_2, \ldots y_n]$ to the second user cluster 220 if the proximity weight $\alpha$ exceeds a threshold. By contrast, the recommendation system 100 may not assign a preference weight to the third user cluster 230 if the proximity weight $\beta$ does not exceed the threshold.

In some example embodiments, when making a recommendation to a user, the recommendation system 100 may select a user cluster based on preference weights and/or proximity weights. For example, the recommendation system 100 may determine to use the existing data associated with a user to provide one or more recommendations. As such, the recommendation system 100 may select the first user cluster 210 or the second user cluster 220 based on the respective preference weights of each user cluster. In addition to preference weights, the recommendation system 100 may select the first user cluster 210 or the second user cluster 220 based on additional criteria including a ranking associated with each user cluster. The user cluster ranking may correspond to a frequency of interaction (e.g., clicks, purchases) with each user cluster, when a user cluster was last selected, and/or whether a user cluster is subject to a sale or promotion.

When the recommendation system 100 determines to explore new preferences for the user, the recommendation system may select a user cluster without a preference weight. For example, the recommendation system 100 may select the third user cluster 230 or the fourth user cluster 240 as neither user clusters have been used to provide recommendations to the user and have not been assigned a preference weight indicating the user's response to these recommendations. In some example embodiments, the recommendation system 100 may select a user cluster without a preference weight based on proximity weights relative to user clusters having preference weights. For example, the recommendation system 100 may select the third user cluster 230 based on the proximity weight $\beta$ with respect to the first user cluster 210 and not the fourth user cluster 240, which is not assigned any proximity weight with respect to a user cluster having a preference weight.

Alternately or additionally, when exploring new preferences for a user, the recommendation system 100 may select a user cluster without a preference weight based on a ranking of the user cluster. The user cluster ranking may correspond to when a user cluster was last selected. For instance, the recommendation system 100 may select the third user cluster 230 if the third user cluster 230 was selected more (or less) recently than the fourth user cluster. The user cluster ranking may also reflect a frequency of interaction with the user cluster (e.g., clicks on and/or purchases of a corresponding item, category, and/or source). For example, the recommendation system may select the third user cluster 230 if more (or less) users have purchased and/or clicked on cameras (e.g., associated with the third user cluster 230) than children's apparel (e.g., associated with the fourth user cluster 240). Alternately or addition, the user cluster ranking may correspond to whether the user cluster is subject to a sale or promotion. In one example scenario, the recommendation system 100 may select the third user cluster 230 if an online retailer is running a promotion on cameras.

In some example embodiments, the recommendation system 100 (e.g., the clustering module 114) may generate the group 200 of user clusters using one or more clustering techniques including finite mixture based cluster, connectivity-based clustering (e.g., personal rank based clustering), centroid-based clustering, distribution-based clustering, and density-based clustering. According to some example embodiments, the group 200 of user clusters may be generated based on existing data including individual user attributes (e.g., demographics) and preferences (e.g., for an item, category, and/or source). Thus, users belonging to the first user cluster 210 may share a common preference for smartphones and one or more common user attributes (e.g., age, gender, income). As such, in some example embodiments, in addition to and instead of a user's responses to recommendations made based on a user cluster, the recommendation system 100 (e.g., the clustering module 114) may assign a preference weight to a user cluster based on a user's attributes. For example, in addition to and instead a user's response to recommendations of smartphones, the recommendation system 100 may assign the preference weight x based on a match between the user's attributes and common user attributes of users in the first user group 210.

Figure 3:
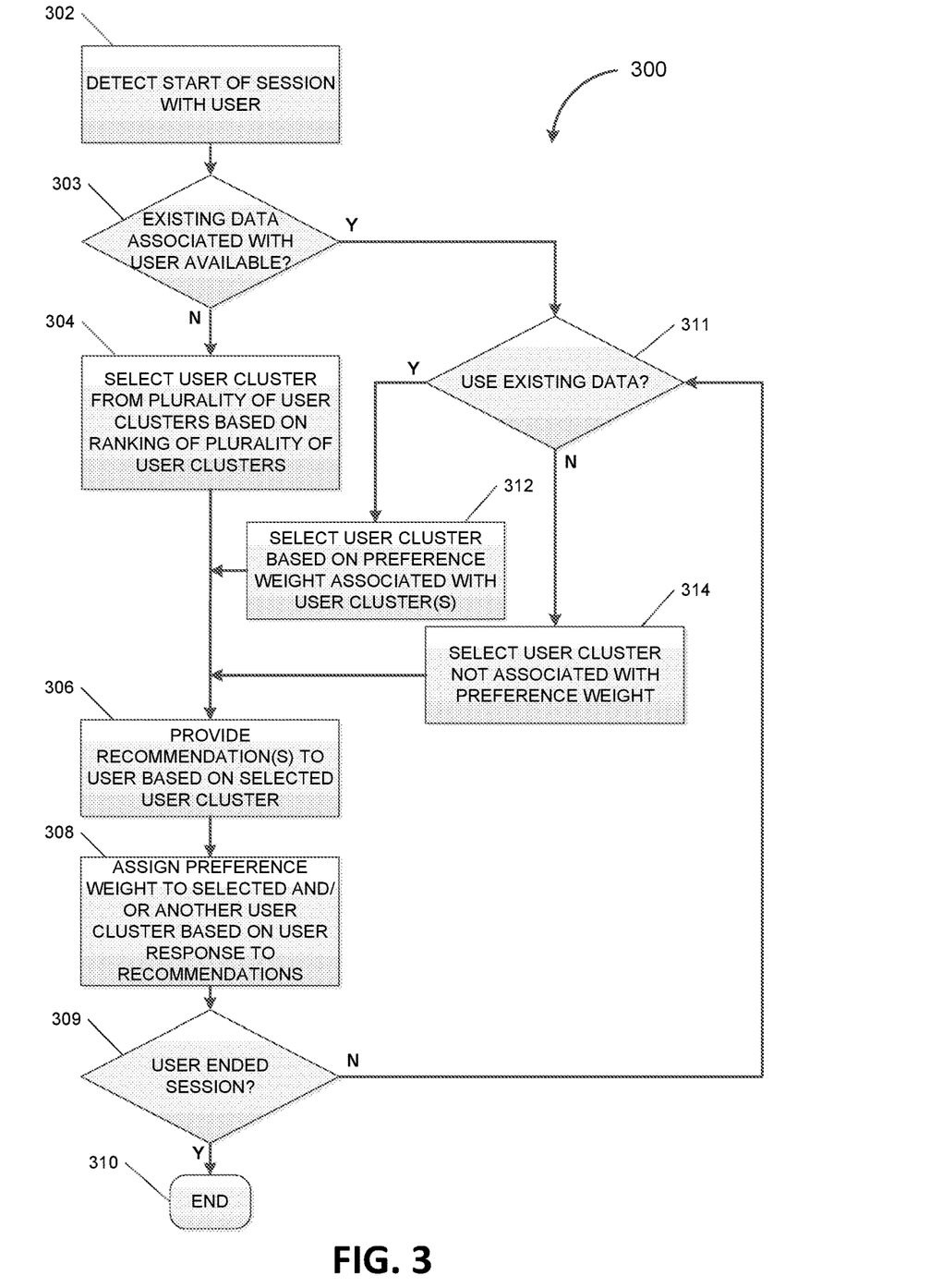
FIG. 3 depicts a flowchart illustrating a process for preference learning, in accordance with some example embodiments.

FIG. 3 depicts a flowchart illustrating a process 300 for preference learning, in accordance with some example embodiments. Referring to FIGS. 1-3, the process may be performed by the recommendation system 100.

The recommendation system 100 may detect a start of a session with a user (302). For example, the recommendation system 100 may detect a start of a session with a user when the user lands on a webpage (e.g. homepage) of an entity (e.g., content provider, online retailer). The session may be a browsing session during which the user interacts with the entity's web site including clicking on product and/or content links and making purchases (e.g. of content and/or products).

The recommendation system 100 may determine whether existing data associated with the user is available (303). For example, the recommendation system 100 may determine whether one or more user clusters have been assigned preference weights associated with the user. In some example embodiments, the recommendation system 100 may determine that existing data associated with the user is not available (303-N). For example, the user may be new to a website, in which case the recommendation system 100 may not have assigned a preference weight to any user clusters based on the user's responses to past recommendations. As such, the recommendation system 100 may select, based at least in part on a ranking of a plurality of user clusters, a user cluster from the plurality of user clusters (304).

According to some example embodiments, the ranking associated with a user cluster may be determined without existing data (e.g., preference weights) associated with the user. For example, the ranking associated with a user cluster may correspond to a frequency of previous interactions (e.g., mouse clicks, purchases) by other users with respect to an item, category, and/or source associated with the user cluster. A higher (or lower) frequency of interaction may correspond to a higher (or lower) ranking for a user cluster. The user cluster ranking may also reflect when the user cluster was last selected by the recommendation system 100. A more (or less) recently selected user cluster may have a higher (or lower) ranking than a less (or more) recently selected user cluster. Alternately or additionally, the user cluster ranking may be determined based on whether an item, category, and/or source associated with the user cluster are subject to a sale or promotion. Being subject to a sale or promotion may increase (or decrease) the user cluster ranking.

The recommendation system 100 may provide, based at least in part on a selected user cluster, one or more recommendations to the user (306). For example, if the recommendation system 100 selects the first user cluster 210, the recommendation system 100 may make one or more recommendations of different smartphones. The recommendation system 100 may make recommendations at any level specificity (e.g., specific products/contents or products/contents from a certain category) without departing from the scope of the present disclosure.

The recommendation system 100 may assign, based at least in part on a response of the user to the one or more recommendations, a preference weight to the selected user cluster and/or another user cluster (308). For example, based on the user's responses to one or more recommendations of smartphones, the recommendation system 100 may assign the preference weight x to the first user cluster 210. Alternately or additionally, if the user responds to the recommendations by interacting (e.g., clicking on and/or purchasing) a tablet personal computer, the recommendation system 100 may assign the preference weight vector $[y_1, y_2 \ldots y_n]$ to the second user cluster 220.

In some example embodiments, the preference weight of a user cluster may be a single value (e.g., integer) representative of a user's overall response to recommendations made based on the user cluster. For example, the first user cluster 210 is associated with the preference weight x, which may be assigned without differentiating between the types of responses (e.g., click, purchase) to recommendations (e.g., of smartphones) made based on the first user cluster 210. Alternately or additionally, the preference weight of a user cluster may be a vector representative of different types of user responses to recommendations made based on the user cluster. For example, the second user cluster 220 may be associated with the preference weight vector $[y_1, y_2 \ldots y_n]$. The preference weight vector $[y_1, y_2 \ldots y_n]$ may be assigned depending on the type of responses to the recommendations (e.g., of tablet personal computers) made based on the second user cluster 220.

In some example embodiments, assigning a preference weight to one user cluster may include assigning a preference weight to another user cluster based on the proximity weight associated with the pair of user clusters. For example, when assigning the preference weight x of the first user cluster 210, the recommendation system 100 may also assign a preference weight to each of the second user cluster 220 and the third user cluster 230 based on the proximity weights α and β. According to some example embodiments, the recommendation system 100 may assign a preference weight to one user cluster when assigning a preference weight to another cluster if the proximity weight associated with the user clusters exceeds a threshold.

The recommendation system 100 may determine whether the user has ended the session (309). If the recommendation system 100 determines that the user has ended the session (309-Y), the recommendation system 100 may end the process 300 (310). For example, the user may end the session by leaving the website. In some example embodiments, upon the end of a session with a user, the recommendation system 100 may be configured to store data collected during the user's session (e.g., preference weights) such that the recommendation system 100 may have existing data associated with the user during subsequent sessions with the user. Alternately or additionally, if the recommendation system 100 determines that the user has not ended the session (309-N), the recommendation system 100 may determine whether to use existing data associated with the user to provide one or more recommendations to the user (311).

Alternately or additionally, in response to detecting the start of a session with a user at operation 302, the recommendation system 100 may determine that existing data associated with the user is available (303-Y). For instance, the recommendation system 100 may identify existing data associated with the user if the user is a user returning to the website. As such, the recommendation system 100 may determine whether to use the existing data associated with the user to provide one or more recommendations to the user (311). That is, the recommendations system 100 may determine whether to exploit the existing data or explore new preferences for the user.

In some example embodiments, the recommendation system 100 may apply one or more strategies when determining whether to use the existing data to provide one or more recommendations to the user. The one or more strategies may include ε-greedy, ε-first, ε-decreasing, adaptive ε-greedy based on value differences, and contextual ε-greedy. The recommendation system 100 may apply the one or more strategies to determine the relative proportions of occasions during which the recommendation system 100 may choose to exploit existing data versus explore new preferences for the user. For instance, the recommendation system 100 may choose to explore new preferences during a ε proportion (e.g., 0.1) of occasions and choose to exploit existing data during a (1-ε) proportion (e.g., 0.9) of occasions.

If the recommendation system 100 determines to use existing data associated with the user to provide one or more recommendations to the user (311-Y), the recommendation system 100 may select, based at least in part on the preference weight associated with one or more user clusters, a user cluster (312). For example, the recommendation system 100 may select the first user cluster 210 if the first user cluster 210 has a higher preference weight than the second user cluster 220. In addition to preference weights, in some example embodiments, the recommendation system 100 may select a user cluster based on a ranking associated with the user cluster. For example, the user cluster ranking may reflect a frequency of previous interactions by other users with respect to an item, category, and/or source associated with the user cluster. The user cluster ranking may also correspond to when the user cluster was last selected and/or whether the user cluster is subject to a sale or promotion.

In some example embodiments, the recommendation system 100 may provide, based at least in part on a selected user cluster, one or more recommendations to the user 306). For example, the recommendation system 100 may recommend a specific item (e.g., a smartphone) associated with a user cluster. Alternately or additionally, the recommendation system 100 may also recommend items in a category of items (e.g., electronics) and/or originates from a source (e.g., brand, manufacturer, creator) associated with a user cluster.

The recommendation system 100 may further assign, based at least in part on a response of the user to the one or more recommendations, a preference weight to the selected user cluster and/or another user cluster (308). For example, if the recommendation system 100 selects the first user cluster 210, the recommendation system 100 may assign a preference weight x to the first user cluster 210 based on the user's responses to recommendations of smartphones. The recommendation system 100 may also assign preference weights to the second user cluster 220 and/or the third user cluster 230 based on the user's responses to those user clusters and/or based on the relationship between these user clusters and the first user cluster 210 as indicated by the proximity weights $\alpha$ and $\beta$.

Alternately or additionally, if the recommendation system 100 determines to not use the existing data associated with the user to provide one or more recommendations to the user (311-N), the recommendation system 100 may explore new preferences for the user. Accordingly, the recommendation system 100 may select a user cluster that is not associated with a preference weight (314). When the recommendation system 100 determines to explore new preferences for the user, the recommendation system 100 may select user clusters that have not been previously used in making recommendations and thus have not been assigned any preference weights. For example, the recommendation system 100 may select the third user cluster 230 or the fourth user cluster 240, which have not been assigned with any preference weights.

In some example embodiments, the selection of a user cluster without preference weights may be made based on proximity weights with respect to user clusters that have been assigned preference weights. For example, the recommendation system 100 may select the third user cluster 230 and not the fourth user cluster 240 based on the proximity weight $\beta$ relating the third user cluster 230 to the first user cluster 210, which has been assigned the preference weight x. Alternately or additionally, the recommendation system 100 may select a user cluster without a preference weight based on a user cluster ranking. For example, the user cluster ranking may correspond to a frequency of previous interactions by other users with respect to an item, category, and/or source associated with the user cluster. The user cluster ranking may also correspond to when the user cluster was last selected and/or whether the user cluster is subject to a sale or promotion.

The recommendation system 100 may provide, based at least in part on a selected user cluster, one or more recommendations to the user (306). For example, the recommendation system 100 may recommend a specific item (e.g., a smartphone) associated with a user cluster. Alternately or additionally, the recommendation system 100 may also recommend items in a category of items (e.g., electronics) and/or originates from a source (e.g., brand, manufacturer, creator) associated with a user cluster. The recommendation system 100 may further assign, based at least in part on a response of the user to the one or more recommendations, a preference weight to the selected user cluster and/or another user cluster (308). For instance, the recommendation system 100 may assign a preference weight to a user cluster based on a user's interactions (e.g., clicks, purchases) with a recommended item, category of items, and/or source for items. The recommendation system 100 may further assign preference weights to one or more other user clusters based on proximity weights.

The recommendation system 100 may determine whether the user has ended the session (309). If the recommendation system 100 determines that the user has ended the session (309-Y), the recommendation system 100 may end the process 300 (310). Alternately, if the recommendation system 100 determines that the user has not ended the session (309-N), process 300 may continue at operation 311.

The process 300 may include additional and/or different operations than shown without departing from the scope of the present disclosure. One or more operations of the process 300 may be omitted and/or repeated without departing from the scope of the present disclosure.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method, comprising:
    determining, by at least one data processor, whether an existing data associated with a user is available, wherein the existing data includes at least one preference weight assigned to at least one of a plurality of user clusters;
    in response to determining that the existing data associated with the user is not available,
        selecting, by the at least one data processor and based at least in part on a ranking associated with the plurality of user clusters, a first user cluster from the plurality of user clusters; and
        generating, by the at least data processor and based at least in part on the first user cluster, a recommendation for the user;
    in response to determining that the existing data associated with the user is available, determining, by the at least one data processor, whether to generate the recommendation based on the existing data or to generate the recommendation based on a second user cluster from the plurality of user clusters that is not assigned a preference weight, wherein the determining is based on a first proportion of occasions during which the recommendation is generated based on the existing data and a second proportion of occasions during which the recommendation is generated based on a user cluster without a preference weight;
    generating, by the at least one data processor, the recommendation, the recommendation generated based on the existing data or the second user cluster not assigned the preference weight;
    providing, by the at least one data processor, the recommendation to the user; and
    updating, by the at least one data processor and based at least on a response of the user to the recommendation, an updated preference weight associated with one or more of the plurality of user clusters.

2. The method as recited in claim 1, further comprising:
    determining the relative proportions by at least applying one or more of an ε-greedy strategy, an ε-first strategy, an ε-decreasing strategy, an adaptive ε-greedy based on value differences strategy, and a contextual ε-greedy strategy.

3. The method as recited in claim 1, wherein the second user cluster is selected based at least on a ranking associated with each of a plurality of user clusters not assigned a preference weight.

4. The method as recited in claim 1, wherein the ranking associated with each of the plurality of user clusters corresponds to one or more of a frequency of interaction with each of the plurality of user clusters, when each of the plurality of user clusters was last selected, and whether an item associated with each of the plurality of user clusters is subject to a sale and/or promotion.

5. The method as recited in claim 1, further comprising generating the plurality of user clusters by at least segmenting a plurality of users based at least in part on user attributes and user preferences.

6. The method as recited in claim 1, wherein the first user cluster and the second user cluster are associated with a proximity weight, and wherein the proximity weight indicates a likelihood of the user having a first preference for a first item, a first category of items, and/or a first source of items associated with the first user cluster and a second preference for a second item, a second category of items, and/or a second source of items associated with the second user cluster.

7. The method as recited in claim 1, wherein the response of the user includes a first interaction with a first item associated with the first user cluster, a second interaction with a second item associated with the second user cluster, and/or a third interaction with a third item associated with a third user cluster from the plurality of user clusters.

8. The method as recited in claim 1, wherein the preference weight comprises a vector, and wherein each value in the vector corresponds to a type of response to the recommendation.

9. A system for preference learning, comprising:
    at least one processor; and
    at least one memory including program code, which when executed by the at least one processor, result in operations comprising:
        determining whether an existing data associated with a user is available, wherein the existing data includes at least one preference weight assigned to at least one of a plurality of user clusters;
        in response to determining that the existing data associated with the user is not available,
            selecting, based at least in part on a ranking associated with the plurality of user clusters, a first user cluster from the plurality of user clusters; and
            generating based at least in part on the first user cluster, a recommendation for the user;
        in response to determining that the existing data associated with the user is available, determining whether to generate the recommendation based on the existing data or to generate the recommendation based on a second user cluster from the plurality of user clusters that is not assigned a preference weight, wherein the determining is based on a first proportion of occasions during which the recommendation is generated based on the existing data and a second proportion of occasions during which the recommendation is generated based on a user cluster without a preference weight;
        generating the recommendation, the recommendation generated based on the existing data or the second user cluster not assigned the preference weight;
        providing, the recommendation to the user; and updating, based at least on a response of the user to the recommendation, an updated preference weight associated with one or more of the plurality of user clusters.

10. The system as recited in claim 9, further comprising: determining the relative proportion by at least applying one or more of an ε-greedy strategy, an ε-first strategy, an ε-decreasing strategy, an adaptive ε-greedy based on value differences strategy, and a contextual ε-greedy strategy.

11. The system as recited in claim 9, wherein the second user cluster is selected based at least on a ranking associated with each of a plurality of user clusters not assigned a preference weight.

12. The system as recited in claim 9, wherein the ranking associated with each of the plurality of user clusters corresponds to one or more of a frequency of interaction with each of the plurality of user clusters, when each of the plurality of user clusters was last selected, and whether an item associated with each of the plurality of user clusters is subject to a sale and/or promotion.

13. The system as recited in claim 9, further comprising generating the plurality of user clusters by at least segmenting a plurality of users based at least in part on user attributes and user preferences.

14. The system as recited in claim 9, wherein the first user cluster and the second user cluster are associated with a proximity weight.

15. The system as recited in claim 14, wherein the proximity weight indicates a likelihood of the user having a first preference for a first item, a first category of items, and/or a first source of items associated with the first user cluster and a second preference for a second item, a second category of items, and/or a second source of items associated with the second user cluster.

16. The system as recited in claim 9, wherein the response of the user includes a first interaction with a first item associated with the first user cluster, a second interaction with a second item associated with the second user cluster, and/or a third interaction with a third item associated with a third user cluster from the plurality of user clusters.

17. The system as recited in claim 9, wherein the preference weight comprises a vector, and wherein each value in the vector corresponds to a type of response to the recommendation.

18. A non-transitory computer-readable storage medium including program code which when executed by at least one processor causes operations comprising:
determining whether an existing data associated with a user is available, wherein the existing data includes at least one preference weight assigned to at least one of a plurality of user clusters;
in response to determining that the existing data associated with the user is not available,
selecting, based at least in part on a ranking associated with the plurality of user clusters, a first user cluster from the plurality of user clusters; and
generating based at least in part on the first user cluster, a recommendation for the user;
in response to determining that the existing data associated with the user is available, determining whether to generate the recommendation based on the existing data or to generate the recommendation based on a second user cluster from the plurality of user clusters that is not assigned a preference weight, wherein the determining is based on a first proportion of occasions during which the recommendation is generated based on the existing data and a second proportion of occasions during which the recommendation is generated based on a user cluster without a preference weight;
generating the recommendation, the recommendation generated based on the existing data or the second user cluster not assigned the preference weight;
providing, the recommendation to the user; and
updating, based at least on a response of the user to the recommendation, an updated preference weight associated with one or more of the plurality of user clusters.

* * * * *